(12) United States Patent
Bellon

(10) Patent No.: US 6,823,854 B2
(45) Date of Patent: Nov. 30, 2004

(54) DEVICE FOR PREVENTING AN EXHAUST GAS RECIRCULATION VALVE FROM STICKING AFTER SWITCHING OFF AN INTERNAL COMBUSTION ENGINE

(75) Inventor: Torsten Bellon, Usingen (DE)

(73) Assignee: Siemens Aktiengesellschaft, München ( * ) Notice: Subject to any disclaimer, the term of this patent is extended or adjusted under 35 U.S.C. 154(b) by 0 days.

(21) Appl. No.: 10/718,650

(22) Filed: Nov. 24, 2003

(65) Prior Publication Data

US 2004/0103888 A1 Jun. 3, 2004

Related U.S. Application Data

(63) Continuation of application No. PCT/DE02/01779, filed on May 17, 2002.

(30) Foreign Application Priority Data

May 23, 2001 (DE) .......................................... 101 25 094

(51) Int. Cl.⁷ .............................................. F02M 25/07
(52) U.S. Cl. .............................. 123/568.23; 123/568.16
(58) Field of Search ....................... 123/568.11, 568.16, 123/568.21, 568.23, 568.24; 251/129.1, 129.11, 129.15, 129.16; 701/108

(56) References Cited

U.S. PATENT DOCUMENTS

| | | | | |
|---|---|---|---|---|
| 6,102,016 A | * | 8/2000 | Sitar et al. ............. | 123/568.23 |
| 6,213,446 B1 | * | 4/2001 | Dismon et al. ........ | 251/129.16 |
| 6,443,135 B1 | * | 9/2002 | Dismon et al. ........ | 123/568.23 |

FOREIGN PATENT DOCUMENTS

| | | |
|---|---|---|
| DE | 4024088 C1 | 7/1991 |
| DE | 19603592 C1 | 5/1997 |
| DE | 19549107 A1 | 7/1997 |
| DE | 19704091 A1 | 8/1998 |
| DE | 19801383 A1 | 7/1999 |
| DE | 19848699 A1 | 7/1999 |
| DE | 19825583 A1 | 12/1999 |
| DE | 19914535 A1 | 10/2000 |
| EP | 0887540 A2 | 12/1998 |
| EP | 1028249 A2 | 8/2000 |
| EP | 1065365 A2 | 1/2001 |
| EP | 1091112 A2 | 4/2001 |
| EP | 1103715 A1 | 5/2001 |
| EP | 1126156 A2 | 8/2001 |
| EP | 1201907 A1 | 5/2002 |
| WO | WO01/83975 | 11/2001 |

OTHER PUBLICATIONS

Derwent–Abstract: DE19914535; Oct. 5, 2000; Bayrische Motoren–Werke AG.
Derwent–Abstract: DE19825583; Dec. 16, 1999; Gustav Wahler GmbH.
Derwent–Abstract: DE19704091; Aug. 6, 1998; Gustav Wahler GmbH.

(List continued on next page.)

Primary Examiner—Willis R. Wolfe, Jr.
(74) Attorney, Agent, or Firm—Jacob Eisenberg Siemens AG

(57) ABSTRACT

The invention relates to an exhaust gas recirculation device for an internal combustion engine, especially for a motor vehicle, comprising an exhaust gas recirculation line for recirculating exhaust gas, the line branching off from the exhaust line and running into an unburned gas line. The exhaust gas recirculation line includes a valve having a closing element which can be displaced between a closing position and an opening position by means of an actuator. One aim of the invention is to especially reliably prevent the closing element of the valve from sticking to the valve seat after the operation of the internal combustion engine. To this end, the closing element of the valve is placed in an idle position by means of the actuator, when the internal combustion engine is not in operation.

9 Claims, 5 Drawing Sheets

OTHER PUBLICATIONS

Derwent–Abstract: DE19603592; May 15, 1997; Mercedes–Benz Aktiengesellschaft.

Derwent–Abstract: DE4024088; Jul. 11, 1991; Mercedes–Benz Aktiengesellschaft.

Derwent–Abstract: DE19848699; Jul. 22, 1999; Pierburg AG.

Derwent–Abstract: DE19549107; Jul. 3, 1997; Robert Bosch GmbH.

Derwent–Abstract: DE19801383; Jul. 22, 1999; Pierburg AG.

Derwent–Abstract: EP1091112; Apr. 11, 2001; Pierburg AG.

Derwent–Abstract: EP1065365; Jan. 3, 2001; Daimler-Chrysler AG.

\* cited by examiner

DEVICE FOR PREVENTING AN EXHAUST GAS RECIRCULATION VALVE FROM STICKING AFTER SWITCHING OFF AN INTERNAL COMBUSTION ENGINE

CROSS REFERENCE TO RELATED APPLICATIONS

The present application is a continuation of International Application PCT/DE02/01779, which designated the United States and was filed on May 17, 2002, and further claims priority to German reference DE10125094.0, filed on May 23, 2001, the both of which are herein incorporated by reference.

BACKGROUND OF THE INVENTION

The present invention relates to a device for preventing an exhaust gas recirculation valve for an internal combustion engine, in particular for a motor vehicle, from sticking, having a recirculation line which branches off from an exhaust line and leads into a fresh gas line and is used for recirculating exhaust gas, the recirculation line having a valve with a closing element and the closing element being able to be moved between a closing position and an opening position via an actuator, and when the internal combustion engine is not in operation, the closing element of the valve being placed in an idle position by means of the electric motor.

In an internal combustion engine, a fuel/air mixture is fed to the internal combustion engine, burned there and subsequently led out of the internal combustion engine again as exhaust gas. The exhaust gas led out of the internal combustion engine is usually carried off into the surroundings, but some of it may be fed back to the internal combustion engine. Recirculation of the exhaust gas back into the internal combustion engine takes place by means of an exhaust gas recirculation device. An exhaust gas recirculation device is used to remove some of the exhaust gas from the exhaust line, add it again to the fresh gas line and feed it back to the internal combustion engine.

The recirculation of exhaust gas means that the cylinders of the internal combustion engine obtain, given the same volume of gas, a smaller amount of fresh fuel/air mixture than would be the case if the exhaust gas were not added to the fuel/air mixture. Adding exhaust gas to the fuel/air mixture results in a reduction in the combustion temperature in the cylinders of the internal combustion engine because the recycled exhaust gas no longer actively participates in the combustion.

At a low combustion temperature in comparison to a high combustion temperature, fewer nitrogen oxides are produced and the proportion of unburned hydrocarbon compounds or CH compounds increases. The proportion of unburned hydrocarbon compounds and the fuel consumption which may increase determine the upper limit of the exhaust gas recirculation rate. For example in the case of direct injection diesel engines when idling, the exhaust gas recirculation rate can be up to 50%. In addition, given a particularly high recirculation of exhaust gas, the quiet running of the internal combustion engine may deteriorate.

In the operating ranges of the internal combustion engine in which the internal combustion engine is to be operated with a particularly rich fuel/air mixture, for example at full load, the exhaust gas recirculation device is turned off. In this case, a rich fuel/air mixture means that significantly less air is actually sucked in than is theoretically required for complete combustion. Correspondingly, a lean mixture also refers to an excess of air.

The recirculation of exhaust gas conventionally takes place via an exhaust gas recirculation line which connects the exhaust line to the fresh gas line. In this case, the exhaust gas recirculation line can branch off from the exhaust line directly after the engine and before the exhaust. For a variable rate of recirculation of exhaust gas, a valve is frequently fitted into the exhaust gas recirculation line. The closing element of the valve can conventionally be activated by a control unit as a function of different parameters, for example rotational speed of the engine and engine temperature.

During operation of the internal combustion engine and of the exhaust gas recirculation device, the exhaust gas recirculation line and the valve seat and the closing element of the valve, inter alia, become clogged due to impurities in the exhaust gas. During operation of the internal combustion engine, these impurities form a virtually liquid film on the walls of the exhaust gas recirculation line, an the valve seat and on the closing element of the valve. When the internal combustion engine is switched off, cooling or cooled impurities from the exhaust gas are deposited on the walls of the exhaust gas recirculation line, on the valve seat and on the closing element of the valve.

Due to the impurities forming layers on the exhaust gas recirculation line, on the valve seat and on the closing element of the valve, the closing element of the valve can adhere to the valve seat or to the exhaust gas recirculation line when the internal combustion engine is switched off. This is because, when the internal combustion engine is switched off, the closing element of the valve is conventionally moved into its closing position. The effect of the closing element of the valve adhering to its valve seat or to the exhaust gas recirculation line due to deposited impurities from the exhaust gas may be that the valve can no longer be opened by the means provided for this, for example an electric motor, upon renewed operation of the internal combustion engine. Operation of the exhaust gas recirculation device is no longer possible with a closing element of the valve adhering to the valve seat. Re-starting of the exhaust gas recirculation device is only possible following cleaning of the closing element of the valve and of the valve seat and of the exhaust gas recirculation line.

DE-A-198 25 583 discloses an exhaust gas recirculation device of the type mentioned at the beginning, in which the closing element is placed in its idle position by means of a spring.

DE-A-198 01 383 likewise discloses an exhaust gas recirculation device of the type mentioned at the beginning, in which, when the ignition is switched off, an engine controller activates the drive of the closing element in such a manner that the closing element is moved into its opening position and is blocked there.

SUMMARY OF THE INVENTION

The invention is based on the object of specifying a device of the type mentioned above for an internal combustion engine, in which, with a particularly small outlay on production, the closing element of the valve is particularly reliably prevented from adhering to the valve seat or to the exhaust gas recirculation line.

This and other objects are achieved according to the invention in that, the closing element of the valve can be activated by the actuator via a gear mechanism, it being possible for a rotational movement of the actuator to be converted into a linear movement of the closing element of the valve by means of the gear mechanism, and in that the gear mechanism has a first movement range and a second movement range, the first movement range being limited by the opening position and the closing position of the closing element of the valve, and the second movement region being limited by the closing position and the idle position of the closing element of the valve.

The invention is based on the consideration that an exhaust gas recirculation device which is to be produced with a particularly low outlay on production and in which, at the same time, the closing element of the valve is particularly reliably prevented from adhering to the valve seat or to the exhaust gas recirculation line, is to have a particularly small number of components. Therefore, as small as possible a number of additional elements should be required in order to reliably prevent the closing element of the valve from adhering to the valve seat or to the exhaust gas recirculation line even when the internal combustion engine is not in operation. The "trailing effect" of the control apparatus can therefore be used to make a movement of the closing element of the valve possible by means of an actuator even after the internal combustion engine is switched off. The time-delayed turning off of the electronic control unit after the ignition of the internal combustion engine has been switched off enables the closing element of the valve to be shifted, when the internal combustion engine is not in operation, into an "idle position", in which the valve is at least partially open. The idle position differs with the closing position and the opening position of the closing element of the valve. It is situated between the completely closed and completely open states of the closing element of the valve.

The use of a gear mechanism makes it possible to use a standard electric motor as actuator, as a result of which the outlay on costs for the exhaust gas recirculation device are particularly low. In addition, the movement of the closing element of the valve and therefore the region between the opening position and closing position of the closing element of the valve can be particularly finely adjusted by means of the gear mechanism.

The definition of an idle position for the closing element of the valve, which position lies outside the customary movement range of the closing element of the valve, enables this idle position to be configured individually as a function of the vehicle type, size of the engine and impurities from the fuel which is used.

The idle position of the closing element of the valve is advantageously predetermined by a stop for the gear mechanism. A stop may also be adjusted subsequently, for example during maintenance work on the motor vehicle and on the internal combustion engine, thus enabling the exhaust gas recirculation device to be adapted in a particularly simple manner to wear and changed operating conditions. In this connection, it proves particularly advantageous if the stop can be adjusted by itself.

The gear mechanism for resetting the closing element both into the idle position and into the closing position advantageously has a resetting spring. A resetting spring, which is stressed when the closing element of the valve is opened and, when the valve is open, pushes the closing element back counter to the force of the actuator into the closing position or the idle position, can move the closing element of the valve into the closing position should the actuator fail. A prerequisite for this is that the actuator can be moved by the force of the resetting spring. The resetting spring particularly reliably ensures that, should the actuator fail, the closing element of the valve is moved into the closing position or is fixed in the idle position. With a defective actuator, the internal combustion engine can be used, albeit without the exhaust gas recirculation device, but otherwise correctly.

The current position of the closing element of the valve can advantageously be detected by a sensor connected to a control device. This makes it possible, in all operating states of the exhaust gas recirculation device, to check where the closing element of the valve is currently placed. This enables the respectively current position of the closing element to be particularly finely coordinated with other parameters of the internal combustion engine.

The valve is advantageously a disk valve. A disk valve has an approximately disk-shaped closing element with a retaining element. A corresponding cutout in a pipe wall can be particularly reliably covered by a disk valve. For complete covering of the pipe wall by the disk valve, there can be sealing elements between the pipe wall and the approximately disk-shaped closing element. The approximately disk-shaped closing element can be moved either into the pipe for opening purposes or else out of the pipe for opening purposes.

The amount of fresh gas to be supplied to the internal combustion engine can advantageously be set via an activatable swing-valve mechanism, the valve leading downstream directly after the activatable swing-valve mechanism into the fresh gas line. This reliably ensures that the exhaust gas conducted into the fresh gas line is thoroughly mixed with the fresh gas.

The swing-valve mechanism is advantageously a butterfly valve. The amount of gaseous medium fed in can be controlled in a particularly simple manner by means of a butterfly valve.

The internal combustion engine is advantageously a direct injection spark ignition engine or a direct injection diesel engine. Systems for direct injection engines, i.e. spark ignition and diesel engines, are high-rate systems with severe sooting tendency. The condensate which arises encourages the valve to adhere in the seat after the internal combustion engine is switched off. With the above-described exhaust gas recirculation device, the risk of the valve adhering to its seat is particularly small.

The advantages obtained by the invention reside, in particular, in the fact that a fixedly predeterminable idle position is specified within or outside the movement range for the closing element. The use of the trailing effect of the control apparatus after the internal combustion engine is switched off enables the closing element to be moved into the idle position. An additional technical outlay on the internal combustion engine for the closing element of the valve to be moved into the idle position is therefore not required. Adhering or sticking of the closing element of the valve to its valve seat or to the exhaust gas recirculation line is particularly reliably prevented by the movement of the closing element of the valve into the idle position when the internal combustion engine is switched off. This means that the exhaust gas recirculation device is particularly low maintenance and at the same time has a particularly long service life.

BRIEF DESCRIPTION OF THE SEVERAL VIEWS OF THE DRAWINGS

An exemplary embodiment will be explained in greater detail with reference to a drawing, in which, in the figures.

DETAILED DESCRIPTION OF THE INVENTION

Parts which correspond to one another are provided with the same reference numbers in all of the figures.

Figure 1:
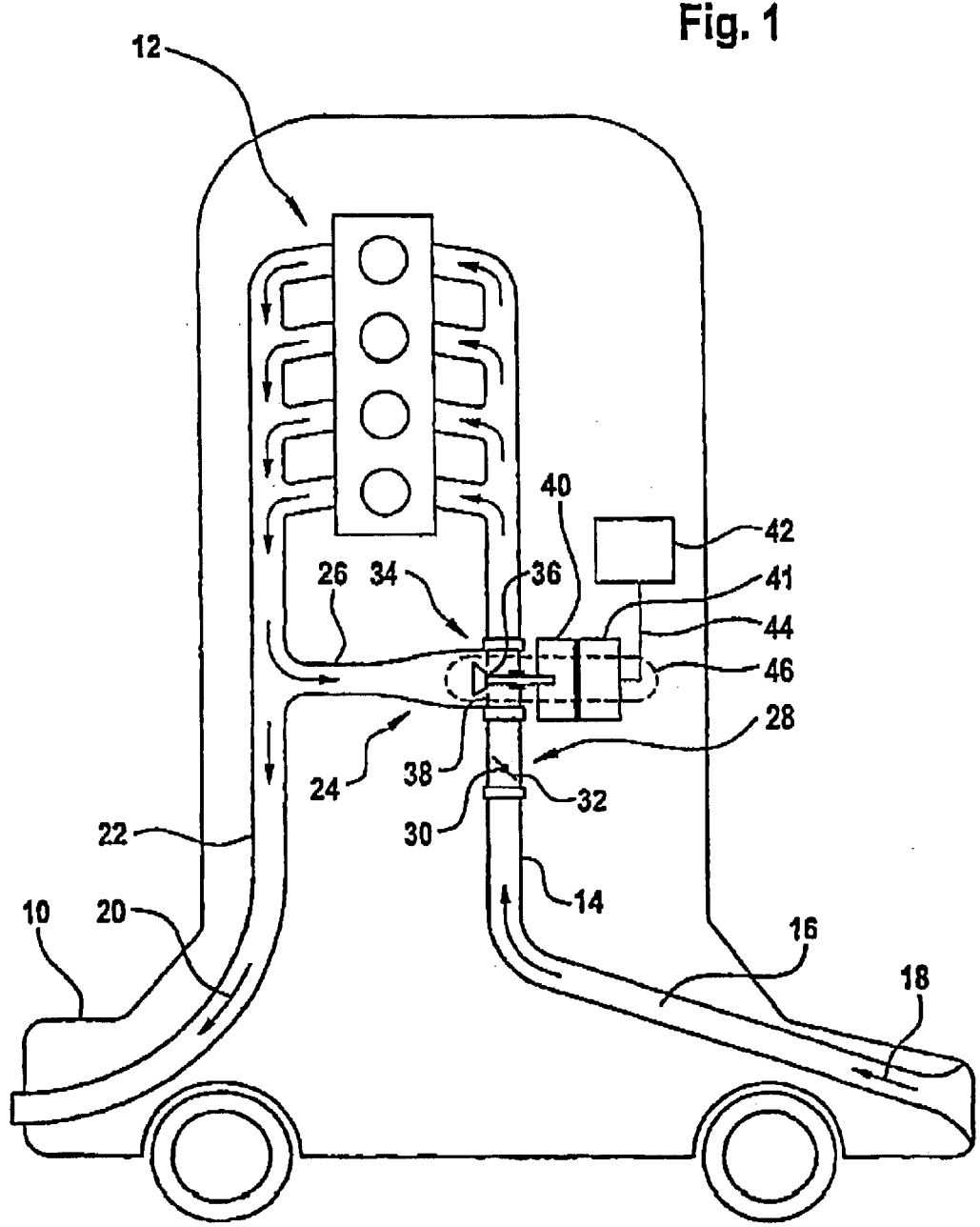
FIG. 1 shows, schematically, an internal combustion engine with an exhaust gas recirculation device.

The motor vehicle 10 according to FIG. 1 comprises an internal combustion engine 12. The internal combustion engine 12 comprises a multiplicity of components, for example injection nozzles for fuel, a fuel pump, pistons and cylinders, this not being illustrated specifically in the drawing. A fresh gas line 14 having a pipe Interior 16 which is connected on the input side to the surroundings of the motor vehicle 10 leads into the internal combustion engine 12. Fresh gas 18 is fed via the pipe interior 16 of the fresh gas line 14 to the internal combustion engine 12 for the combustion of fuel. The fuel may be diesel or petrol. This exemplary embodiment illustrates an internal combustion engine 12 which is provided for diesel. In the internal combustion engine 12, fresh gas 18 is mixed with fuel in a manner not illustrated specifically and is burned.

The exhaust gas 20 which arises during the combustion is carried away into the surroundings of the motor vehicle 10 via an exhaust line 22. To recirculate exhaust gas 20 into the internal combustion engine 12 of the motor vehicle 10, the motor vehicle 10 has an exhaust gas recirculation device 24. The exhaust gas recirculation device 24 comprises an exhaust gas recirculation line 26 which branches off from the exhaust line 22 and leads into the fresh gas line 14. The opening of the exhaust gas recirculation line 26 into the fresh gas line 14 is provided directly after a swing-valve mechanism 28. The amount of fresh gas 18 which can be fed to the internal combustion engine 12 can be adjusted via the swing-valve mechanism 28. For this purpose, the swing-valve mechanism 28 has a butterfly valve 32 which is arranged in a rotatable manner on a shaft 30.

The exhaust gas recirculation device 24 furthermore comprises a valve 34 with a closing element 36. Further elements of the valve 34, such as, for example, the housing, seals and flanges for screwing it down are not illustrated specifically in the drawing. The closing element 36 is arranged in the pipe interior 16 of the fresh gas line 14. The valve 34 uses its closing element 36 to close, from the interior 16 of the fresh gas line 14, a valve seat 38 which is formed as an edge region of a cutout in the pipe wall of the fresh gas line 14. As an alternative, however, the valve seat 38 which is formed as an edge region of the cutout in the pipe wall of the fresh gas line 14 can also be closable from the outside by the closing element 36 of the valve 34.

In addition, the exhaust gas recirculation device 24 comprises a gear mechanism 40 to which the closing element 36 of the valve 34 is connected. The gear mechanism 40 can be activated by a control unit 42 via a control line 44 by means of an actuator 41 which is designed as an electric motor. FIGS. 2 to 5 show the approximately oval-shaped cutout 46 which is indicated by a dashed line in FIG. 1. FIGS. 2 to 5 each show different positions of the closing element 36 of the valve 34.

Figure 2:
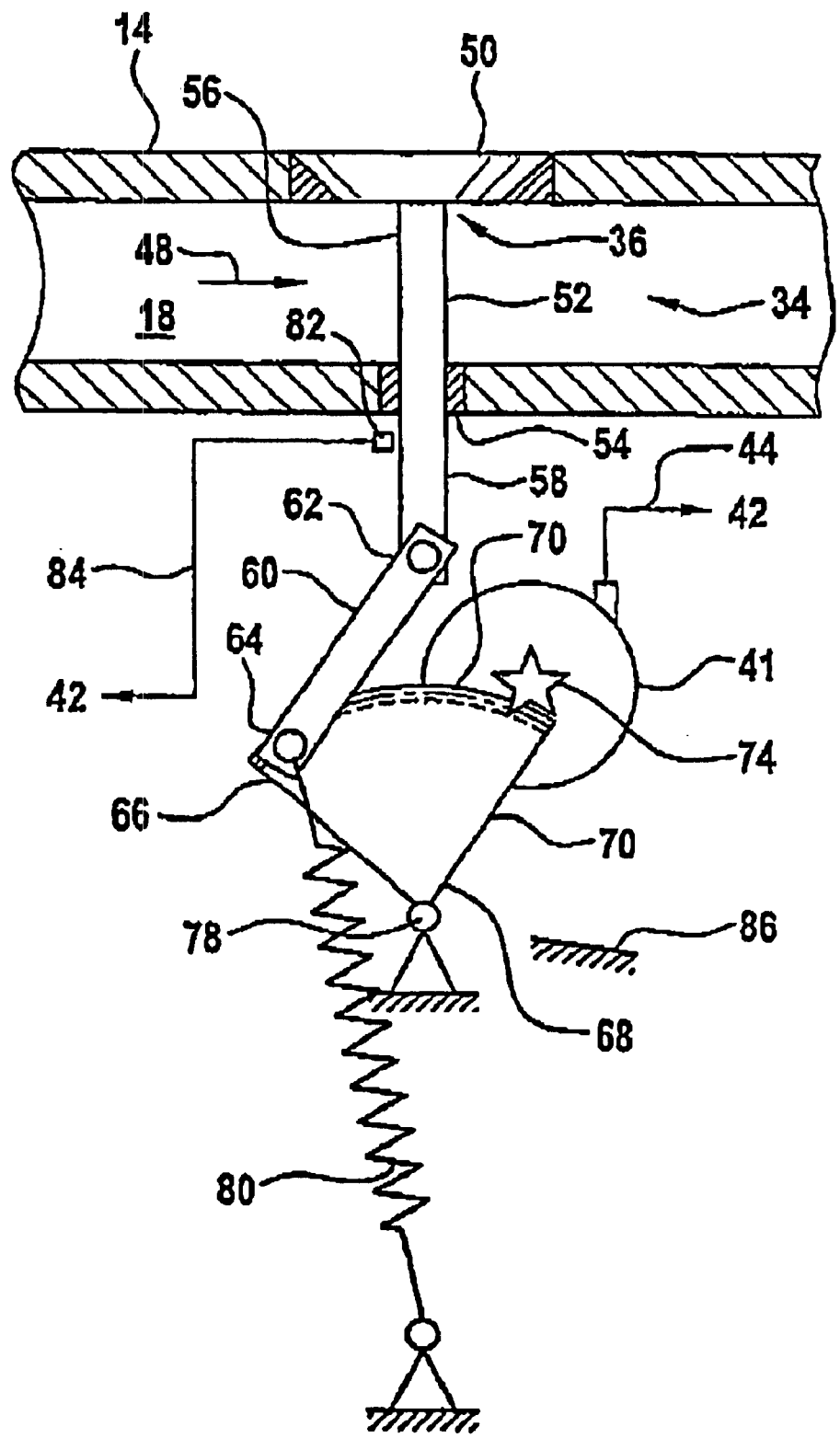
FIG. 2 shows, schematically, the closing mechanism according to FIG. 1 in the closed state.

FIG. 2 shows the section of the fresh gas line 14 with its pipe interior 16 in which the valve 34 is arranged. Fresh gas 18 flows through the fresh gas line 14 in accordance with the direction of the arrow 48. The closing element 36 of the valve 34 comprises an approximately disk-shaped closure element 50 and a retaining element 52 which is arranged on the approximately disk-shaped closure element 50. The approximately disk-shaped closure element 50 closes the valve seat 38. The retaining element 52 is connected rigidly at its first end 56 to the approximately disk-shaped closure element 50. As an alternative to this, the retaining element can also be connected at its first end 56 in a flexible manner, for example via a spring, to the approximately disk-shaped closure element 50. With its second end 58, the retaining element 52 is passed with a seal 54 through the pipe wall of the fresh gas line 14 on that side of the pipe wall of the fresh gas line 14 which lies opposite the valve seat 38. The valve 34 comprises further elements, such as, for example, a housing, seals and connecting flanges, which are not illustrated specifically in the drawing.

The retaining element 52 of the closing element 36 of the valve 34 is connected to the gear mechanism 40. For this purpose, the gear mechanism 40 comprises a pivoting arm 60 which is connected at its first end 62 in a rotatable manner to the second end 58 of the retaining element 52. The pivoting arm 60 and the retaining element 52 of the closing element 36 can be rotated about the connecting point. The second end 64 of the pivoting arm 60 is, in turn, connected in a rotatable manner to a first corner region 66 of an approximately triangular toothed segment 68, both the toothed segment 68 and the pivoting arm 60 being rotatable about the connecting point.

The toothed segment 68 of the gear mechanism 40 can be acted upon on one of its three sides 70 by the actuator 41 designed as an electric motor. For this purpose, the actuator 41 which is designed as an electric motor has a drivable toothed wheel 74 which engages in a corresponding toothing of the toothed segment 68. The toothing of the toothed segment 68 is arranged on one of the sides 70 of the approximately triangular toothed segment 68, the side 70 having the toothing being designed approximately in the shape of a circular arc so that the toothing can engage, upon rotation of the toothed segment 68, into the toothed wheel 74 of the actuator 41 designed as an electric motor. The toothed segment 68 is fixed in a pivotable manner at a fixing point 78 in a second corner region 76.

The pivoting arm 60 is connected in its second end region 64 not only to the approximately triangular toothed segment 68, but in addition also to a resetting spring 80. The resetting spring 80 is designed in such a manner that it always pushes the pivoting arm 60 back into the position according to FIG. 2 that corresponds to the closing position of the valve 34.

A sensor 82 which is connected via a sensor line 84 to the control unit 42 according to FIG. 1 is connected to the closing element 36 of the valve 34. During operation of the valve 34, the sensor 82 detects the current position of the closing element 36. As a function of the current position of the closing element 36 of the valve 34 in each case, the control unit 42 activates the actuator 41, which is designed as an electric motor, via the control line 44 in such a manner that the desired position of the closing element 36 of the valve 34 always corresponds to the actual position.

Figure 3:
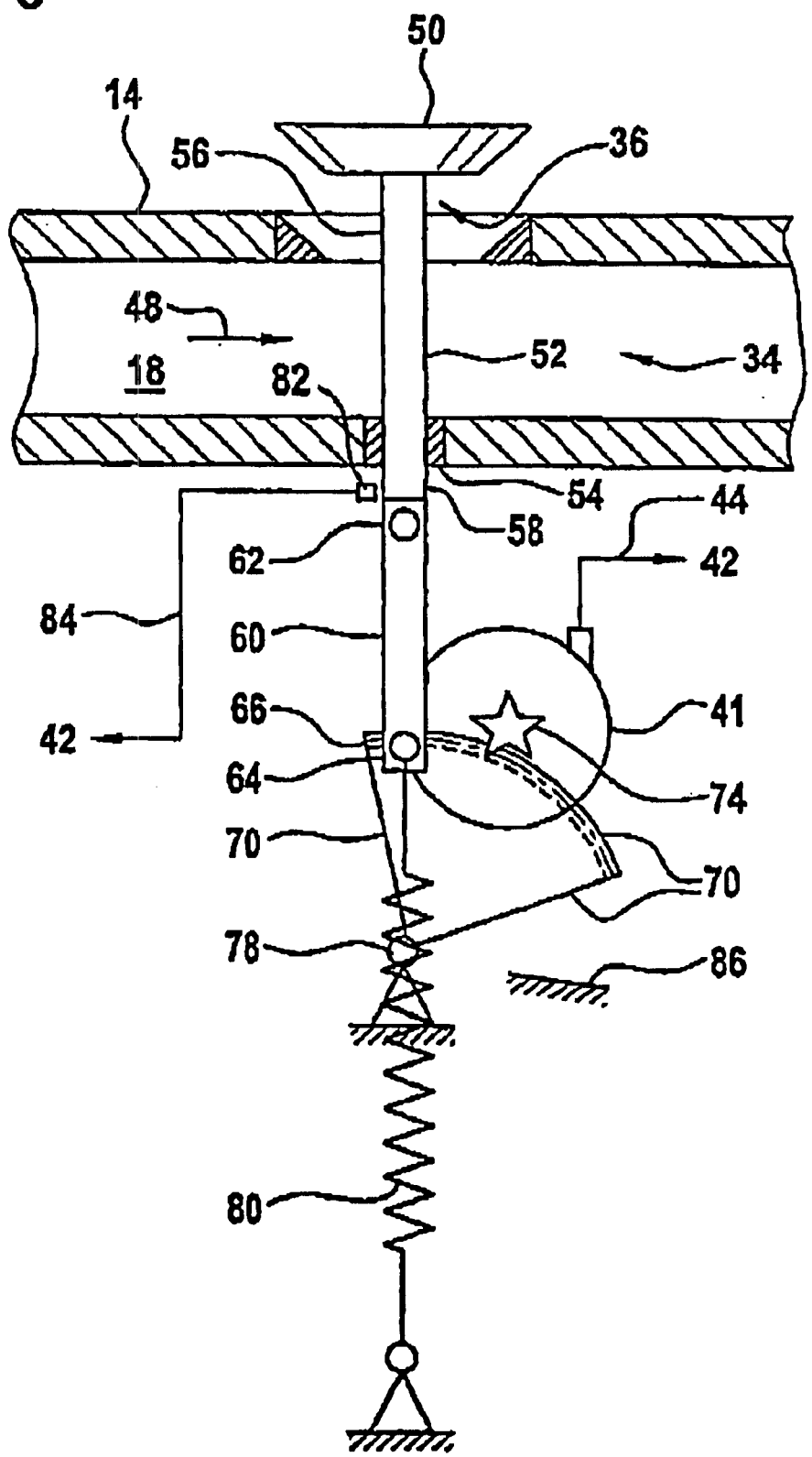
FIG. 3 shows the closing mechanism according to FIG. 1 in the state of maximum opening.

FIG. 3 shows the valve 34 in the "opening position". The toothed segment 68 has been moved from the position according to FIG. 2 into the position according to FIG. 3 by the toothed wheel 74 of the actuator 41 designed as an electric motor. The resetting spring So is in a state of maximum stress. The resetting force of the resetting spring 80 is limited by the supply of current to the actuator 41 which is designed as an electric motor.

Figure 4:
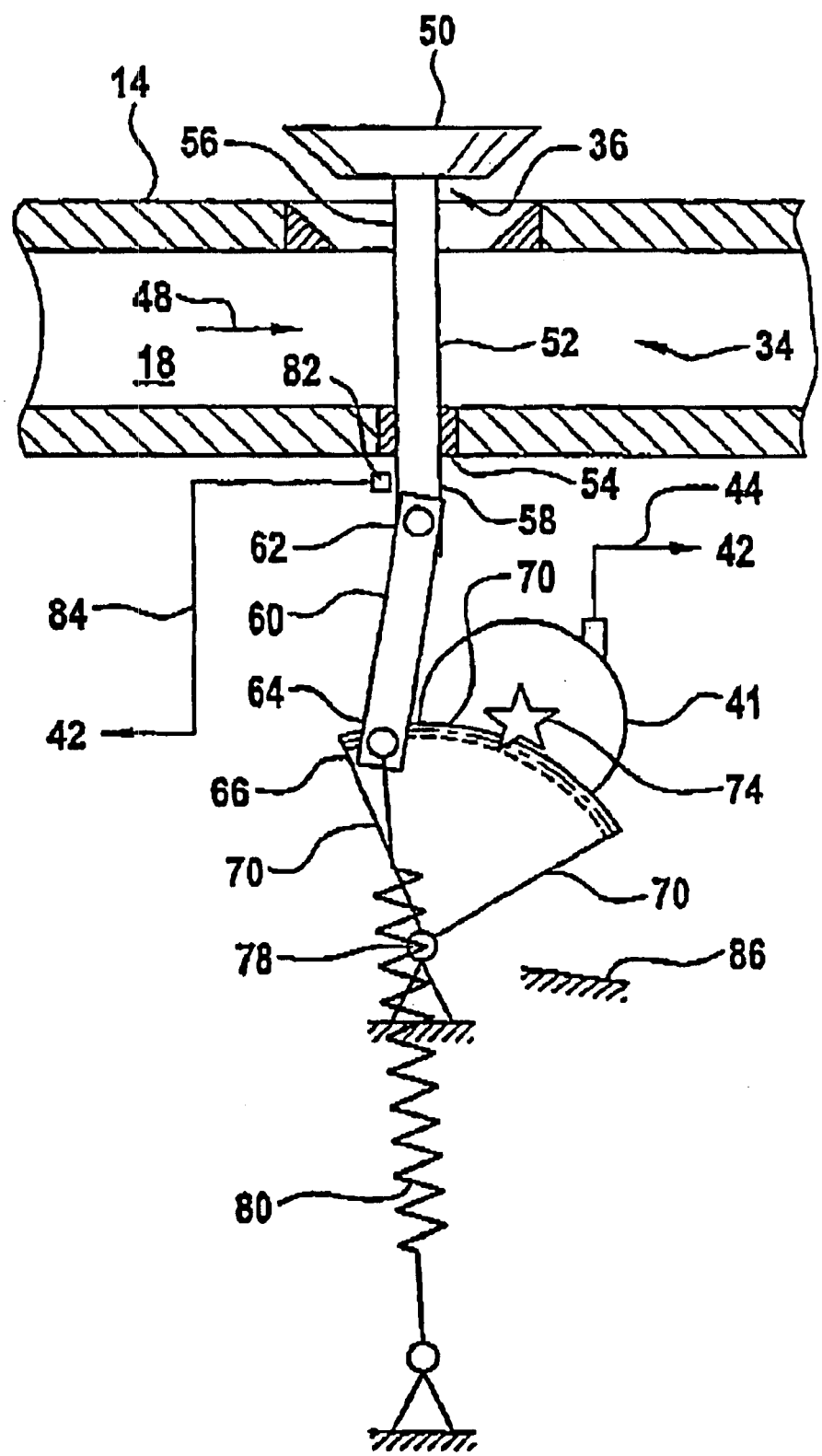
FIG. 4 shows the closing mechanism in the state of the open position according to FIG. 1.

FIG. 4 shows the closing element 36 of the valve 34 in a second opening position which corresponds to the maximum opening position in the control range of the valve 28.

Figure 5:
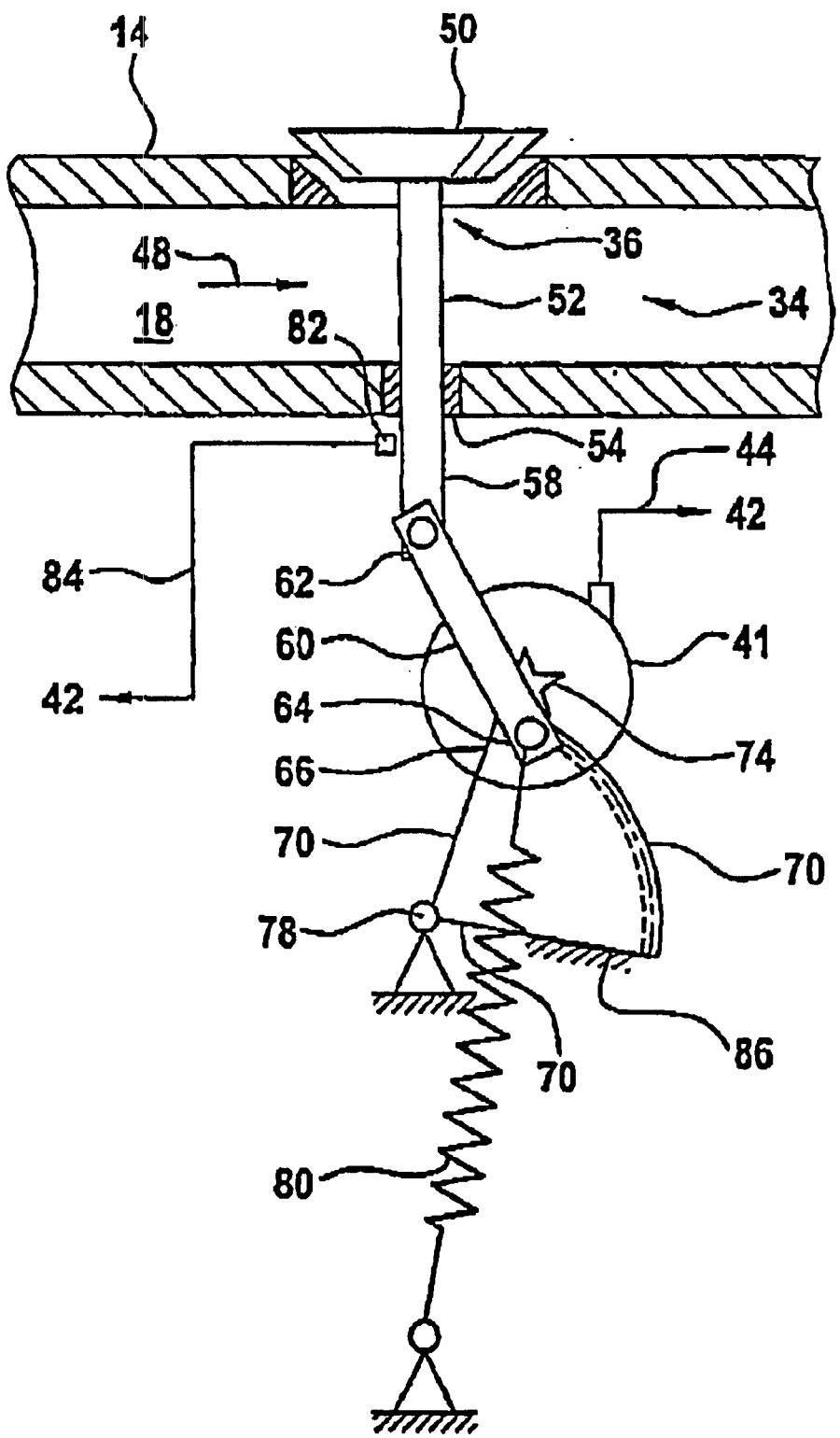
FIG. 5 shows the closing mechanism in the idle position according to FIG. 1.

Finally, FIG. 5 shows the valve 34 in the idle position. The toothed segment 68 bears with its one side 70 against a stop 86. The closing element 36 of the valve 34 has been brought into this position via a movement of the actuator 41 that drives the pivoting arm 60.

In the process, the resetting spring 80 fixes the closing element 36 in its idle position. The stop 86 can change its current position, this not being illustrated specifically in the drawing.

During operation of the motor vehicle 10, fresh gas 18 is fed to the internal combustion engine 12 via the fresh gas line 14. Combustion of fuel takes place in the internal combustion engine 12 with the addition of fresh gas 18, which is not illustrated specifically in the drawing. The exhaust gas 20 is carried out of the internal combustion engine 12 via the exhaust line 22.

During operation of the motor vehicle 10 the exhaust gas recirculation device 24 is also operated. For this purpose, exhaust gas 20 is fed out of the exhaust line 22 into the exhaust gas recirculation line 26. This takes place without additional auxiliary means by the exhaust gas recirculation line 26 branching off from the exhaust line 22. As an alternative, it is also possible, however, for exhaust gas 20 to be actively removed from the exhaust line 22 for feeding into the exhaust gas recirculation line 26.

The amount of exhaust gas 20 which is added to the fresh gas 18 is controlled via the control unit 36 by means of a movement of the closing element 36. For this purpose, the control unit 42 is connected in a manner not illustrated specifically to further components of the internal combustion engine 12, which are likewise not illustrated specifically. As a function of parameters which the control unit 42 obtains from further elements of the internal combustion engine 12, the control unit 36 controls the amount of exhaust gas 20 to be added to the fresh gas 18 by means of a movement of the closing element 36. The first movement range of the gear mechanism 40 lies between the closing position according to FIG. 2 and the opening position according to FIG. 4. The position of the closing element 36 of the valve 34 determines here how much exhaust gas 20 is fed into the fresh gas 18 of the fresh gas line 14.

When the motor vehicle 10 is not in operation, the cooling and cold impurities from the exhaust gas 20 form a film in the flow region of the fuel/air mixture, as a result of which there is the risk of the closing element 36 adhering to the valve seat 38 because of the cooling film. In order now to reliably prevent the closing element 36 from adhering to the valve seat 38 after operation of the motor vehicle 10 when the internal combustion engine 12 is not in operation, the closing element 36 of the valve 34 is moved by means of the actuator 41, which is designed as an electric motor, and the gear mechanism 40 into the idle position according to FIG. 5 after the internal combustion engine 12 is switched off. In this case, the idle position of the closing element 36 of the valve 34 is defined by the stop 86. A movement of the closing element 36 of the valve 34 into its idle position takes place via current which is still available after the internal combustion engine 12 is switched off. This phase is also referred to as the trailing effect of the control apparatus. This second movement range of the gear mechanism 40 therefore lies between the closing position according to FIG. 2 and the idle position according to FIG. 5. The arrangement of the closing element 36 of the valve 34 in the idle position instead of in the closing position reliably prevents the closing element 36 from adhering to the valve seat 38 of the fresh gas line 14.

When the internal combustion engine 12 of the motor vehicle 10 is re-started, a movement of the closing element 36 of the valve 34 into the closing position according to FIG. 2 takes place by means of the control unit 42. Further operation of the exhaust gas recirculation device 24 takes place from the closing position.

In order to ensure correct operation of the internal combustion engine 12 even if the actuator 41 which is designed as an electric motor should fail, the closing element 36 is designed in such a manner that it can be moved in the de-energized state by the resetting spring 80. If, during operation of the exhaust gas recirculation device 24, the actuator 41 which is designed as an electric motor fails, the resetting spring 80 pushes back the toothed segment 68 from an opening position in the movement range of the gear mechanism 40 between the opening position according to FIG. 4 and the closing position according to FIG. 2 into the closing position according to FIG. 2. Further operation of the exhaust gas recirculation device is not possible without operation of the actuator 41 designed as an electric motor. However, operation of the internal combustion engine 12 is reliably ensured even without operation of the exhaust gas recirculation device 24, as a result of which the driver of the motor vehicle can at least travel as far as the next repair garage.

In the exhaust gas recirculation device 24, reliable operation of the exhaust gas recirculation device is ensured by the movement range of the gear mechanism 40 between the closing position according to FIG. 2 and the maximum opening position according to FIG. 3. Even if the internal combustion engine 12 is not in operation, the closing element 36 is reliably prevented from adhering to the valve seat 38 by the fact that the closing element 36 of the valve 34 is moved into a state with a small opening position when the internal combustion engine 12 is switched off. Should the actuator 41 which is designed as an electric motor fail in this position, then a constant amount of exhaust gas 20 is continuously added to the fresh gas 18. The idle position of the closing element 36 of the valve 34 is dimensioned in such a manner that correct operation of the internal combustion engine 12 is ensured and, at the same time, the closing element 36 is prevented from adhering to the valve seat 38.

I claim:

1. A device for preventing an internal combustion engine exhaust gas recirculation valve from sticking after the engine is switched off, comprising:

an exhaust gas recirculation line branching off from an exhaust line and leading into a fresh gas line, the recirculation line being used for recirculating exhaust gas and having a valve with an actuator driven closing element such that when the engine is not in operation the closing element is in an idle position, the closing element being activated by the actuator via a gear mechanism such that a rotational movement of the actuator is converted into a linear movement of the closing element by means of the gear mechanism, and wherein the gear mechanism has a first movement range and a second movement range, the first movement range being limited by an opening and a closing position of the closing element, and the second movement range being limited by the closing and idle position of the closing element.

2. The device according to claim 1, wherein the idle position of the closing element is predetermined by a stop for the gear mechanism.

3. The device according to claim 2, wherein the stop is adjustable.

4. The device according to claim 1, wherein the gear mechanism further comprises a resetting spring arranged to facilitate resetting the closing element both into the idle position and into the closing position.

5. The device according to claim 1, further comprising a sensor and a control unit connected to one another and arranged to detect a current position of the closing element.

6. The device according to claim 1, wherein the valve is a disk valve.

7. The device according to claim 1, further comprising an activatable spring-valve mechanism arranged such that the valve leads downstream of the activatable spring-valve mechanism and into the fresh gas line, and an amount of fresh gas to be supplied to the engine can be set via an activatable spring-valve mechanism.

8. The device according to claim 1, wherein the swing-valve mechanism comprises a butterfly valve.

9. The device according to claim 1, wherein the engine comprises one of a direct injection spark ignition engine or a direct injection diesel engine.

* * * * *